United States Patent [19]

Ichikawa et al.

[11] Patent Number: 5,313,338
[45] Date of Patent: May 17, 1994

[54] EDITING DEVICE WHICH SELECTIVELY EDITS A SECTION OF A HELICAL TRACK

[75] Inventors: Kei Ichikawa, Osaka; Haruo Isaka, Yahata; Yoshio Sakakibara, Neyagawa; Makoto Gotou, Nishinomiya, all of Japan

[73] Assignee: Matsushita Electric Industrial Co., Ltd., Tokyo, Japan

[21] Appl. No.: 865,584

[22] Filed: Apr. 9, 1992

[30] Foreign Application Priority Data

Apr. 11, 1991 [JP] Japan .................................. 3-078864
Feb. 5, 1992 [JP] Japan .................................. 4-019755
Mar. 18, 1992 [JP] Japan .................................. 4-061651

[51] Int. Cl.$^5$ ...................... G11B 27/036; G11B 5/584
[52] U.S. Cl. ...................................... 360/13; 360/14.1; 360/77.14; 358/338
[58] Field of Search ................... 360/13, 14.1, 19.1, 360/69, 77.14, 77.15; 358/338, 341

[56] References Cited

U.S. PATENT DOCUMENTS

| | | | |
|---|---|---|---|
| 4,520,405 | 5/1985 | Sasaki et al. | 360/14.1 |
| 4,602,298 | 7/1986 | Nishitani et al. | 360/14.1 |
| 4,660,103 | 4/1987 | Wilkinson et al. | 360/19.1 |
| 4,860,125 | 8/1989 | van der Meer | 360/13 |
| 4,984,104 | 1/1991 | Takahashi et al. | 360/77.14 |
| 5,088,077 | 2/1992 | Lemoine | 360/77.14 |

Primary Examiner—Edward P. Westin
Assistant Examiner—Benjamin D. Driscoll
Attorney, Agent, or Firm—Wenderoth, Lind & Ponack

[57] ABSTRACT

An editing apparatus for use with a tape-form recording medium is provided in which, according to a positioning signal and a tracking pilot signal multiplex-recorded into the first recording area of each track of the recording medium which consists of a plurality of recording areas separated from each other by gaps, a pilot sampling signal for determining the timing of sampling and an editing timing signal for determining the recording location in a desired recording area following the first recording area are produced. After the tracking control is executed through sampling the tracking pilot signals from adjacent tracks at the timing of the pilot sampling signal, a data signal is recorded into the desired recording area after the first recording area according to the editing timing signal.

8 Claims, 4 Drawing Sheets

EDITING DEVICE WHICH SELECTIVELY EDITS A SECTION OF A HELICAL TRACK

BACKGROUND OF THE INVENTION

1. Field of the Invention

The present invention relates to a recording/reproducing apparatus for recording and reproducing signals of e.g. video, audio, or other information data on a tape-like recording medium such as a magnetic recording tape and, more particularly to, a recording/reproducing apparatus capable of editing the recorded data. The editing function alters the recorded data by replacing or erasing given recording area and adds continuous data to succeeding recording areas after the given recording area.

2. Description of the Prior Art

A variety of magnetic recording/reproducing apparatuses, such as video taperecorders (referred, to as VTRs, hereinafter have been developed and practically used which utilize magnetic recording tapes. Manufacturer efforts have results in size reductions, improved for high density recording, and digital recording. In such devices it is essential for increasing the recording density and maintaining compatibility to allow a magnetic head to perform accurate tracking actions. For this purpose, a tracking control method termed ATF has been introduced for use with a VTR in which a pilot signal is multiplexed onto a data signal during recording and utilized for correct tracking action during retrieval of the data signal. A conventional magnetic recording/reproducing apparatus using such a tracking control method will now be described.

In a recording mode, a row of oblique recording tracks are formed on a magnetic recording tape by a magnetic head mounted on a rotary cylinder. A recording signal fed to the magnetic head contains a data signal frequency multiplexed with pilot signals for tracking control. More particularly, two different pilot signals having frequencies of f1 and f2 respectively are recorded alternately onto every two recording tracks. Commonly, the frequency of each pilot signal is selected from four typical low frequencies which will minimize interference with the data signal.

The action of tracking the such recording tracks in a reproducing mode will be explained. As the magnetic head traces a target track, it reads a segment of the data signal and simultaneously, detects two pilot signal components f1 and f2 of the adjacent recording tracks. The relative position of the magnetic head to the target recording track can hence be examined through comparing the two pilot components f1,f2. In more detail, the two pilot components f1,f2 are extracted through a bandpass filter and converted by an AM detection circuit to their respective DC components depending on their amplitudes. The two DC components are then compared by a subtraction circuit. A resultant output of the subtraction circuit is a tracking error signal denoting a positional difference between the magnetic head and the target track to be traced. Upon receiving the tracking error signal, a capstan motor control circuit for controlling the feeding of a tape actuates a capstan motor to control the tape running so that the magnetic head traces along the center of the target track.

For replacement of the recorded data signal on a magnetic recording tape with another data signal (which will be termed as insert editing), the reproducing mode is shifted to the recording mode at a point of rewriting and the new data signal is recorded while the existing data signal is being erased. More specifically, the new data signal is recorded onto the recording tape, track, by track at the timing determined by a signal from a rotating position detecting sensor mounted to the rotary cylinder.

According to the conventional magnetic recording/reproducing apparatus, the start point of recording on each track for the insert editing action is determined by the signal of the rotating position detecting sensor of the rotary cylinder and thus, the existing data signal in the track will hardly be erased in its entirety due to mechanical non-uniformity and setting error. The remaining data which has not been erased may result in malfunction of the entire apparatus. Also, excessive erasing in the same track will likely be caused during partial rewriting. Particularly, editing with another recording/reproducing apparatus may create more error data thus degrading the performance of the apparatus. Also, the tracking is conducted using pilot signals multiplexed with the data signal according to the conventional apparatus and thus, no tracking control data will be given during the insert editing action. This may result in failure in the time matching between a current track and a preceding track at the end of editing, sequence error of the tracking data carried on the data signal, and development of imperfect track widths.

SUMMARY OF THE INVENTION

An object of the present invention is to provide an editing apparatus for editing information recorded in a tape recording medium with a high positioning accuracy.

According to the present invention, a tape recording medium has formed thereon a plurality of recording tracks each being divided into a plurality of recording areas which are separated by a plurality of gaps such that two adjacent recording areas are separated by a gap disposed therebetween, a first recording area of the plurality of recording areas of each recording track from a beginning end of the track having recorded therein a positioning signal used for determining a position of an editing area.

An editing apparatus of the present invention comprises: recording information signal generating means for generating a recording information signal to be recorded for editing; recording and reproducing head for recording the recording information signal onto the recording medium and for reproducing the recorded signal from the recording medium; selection means which is selectively operable in a first mode for transferring the recording information signal to the head and a second mode for transferring a reproduced signal from the head; editing control means for producing an editing area signal indicative of the editing area; positioning signal detecting means for detecting the positioning signal from a reproduced signal transferred from the selection means in the second mode; and timing signal generating means for generating an editing timing signal indicative of a timing corresponding to the editing area based on the editing area signal and the detected positioning signal from the positioning signal detecting means, wherein the selection means is responsive to the editing timing signal for selecting the first mode to thereby record the recording information signal from the recording information signal generating means into the editing area of the recording medium.

Preferably, the first recording area may have recorded therein the positioning signal multiplexed with a pilot signal for tracking control use. In this modification, the editing apparatus may further comprise: tracking error detection means for detecting the pilot signal from the reproduced signal transferred from the selection means in the second mode and generating from the detected pilot signal a tracking error signal indicative of a tracking error of the head; sampling means for sampling the tracking error signal; and tracking control means responsive to a sampled tracking error signal from the sampling means for controlling a transfer of the recording medium to eliminate the tracking error, wherein the timing signal generating means generates a sampling signal in response to the detected positioning signal from the positioning signal detecting means, and wherein the sampling means is responsive to the sampling signal for sampling the tracking error signal from the tracking error detection means.

According to the foregoing editing apparatus, the timing for starting a recording action on a given track of a recording tape during editing is determined by its own signal so that the relative position of the head to the given recorded track can be maintained with accuracy. Also, the tracking data is retrieved from a first recording area of the track, whereby positional matching between the current track and a preceding track after completion of the editing action will be ensured. Hence, the editing can be executed with higher accuracy.

The sampling of the pilot signal is accurately controlled by the positioning signal stored in the magnetic tape, and the recording area for storage of the pilot signal will thus be minimized to enhance the utilization of the tape recording surface.

The gaps in a track are preferably arranged to become greater in width towards the end of the track. Also, the recording areas of the track are desirably arranged to align from the smallest to the largest in size from the beginning end of the track. Those arrangements can ease a drawback in which the editing accuracy becomes lower in proportion to the distance of a target recording area from the beginning end of the track when the magnetic tape is varied in length by changes in the temperature and humidity, wow-flutter characteristics of the rotary cylinder, or tension of the running tape. The recording areas in each track are separated from each other by the gaps and the gaps are arranged to become wider towards the end of the track, whereby each recording area of the track has an adequate room for its position when the magnetic tape is varied in length and the accuracy in editing will be ensured. The recording areas in the track are also aligned in order from its smallest and thus, the gaps are biased in assignment towards the beginning end of the track and need not have an unnecessary greater width. Accordingly, the area assignment of the gaps in the track will be minimized, thus enhancing the utilization of the tape recording surface.

DESCRIPTION OF THE PREFERRED EMBODIMENTS

Figure 1:
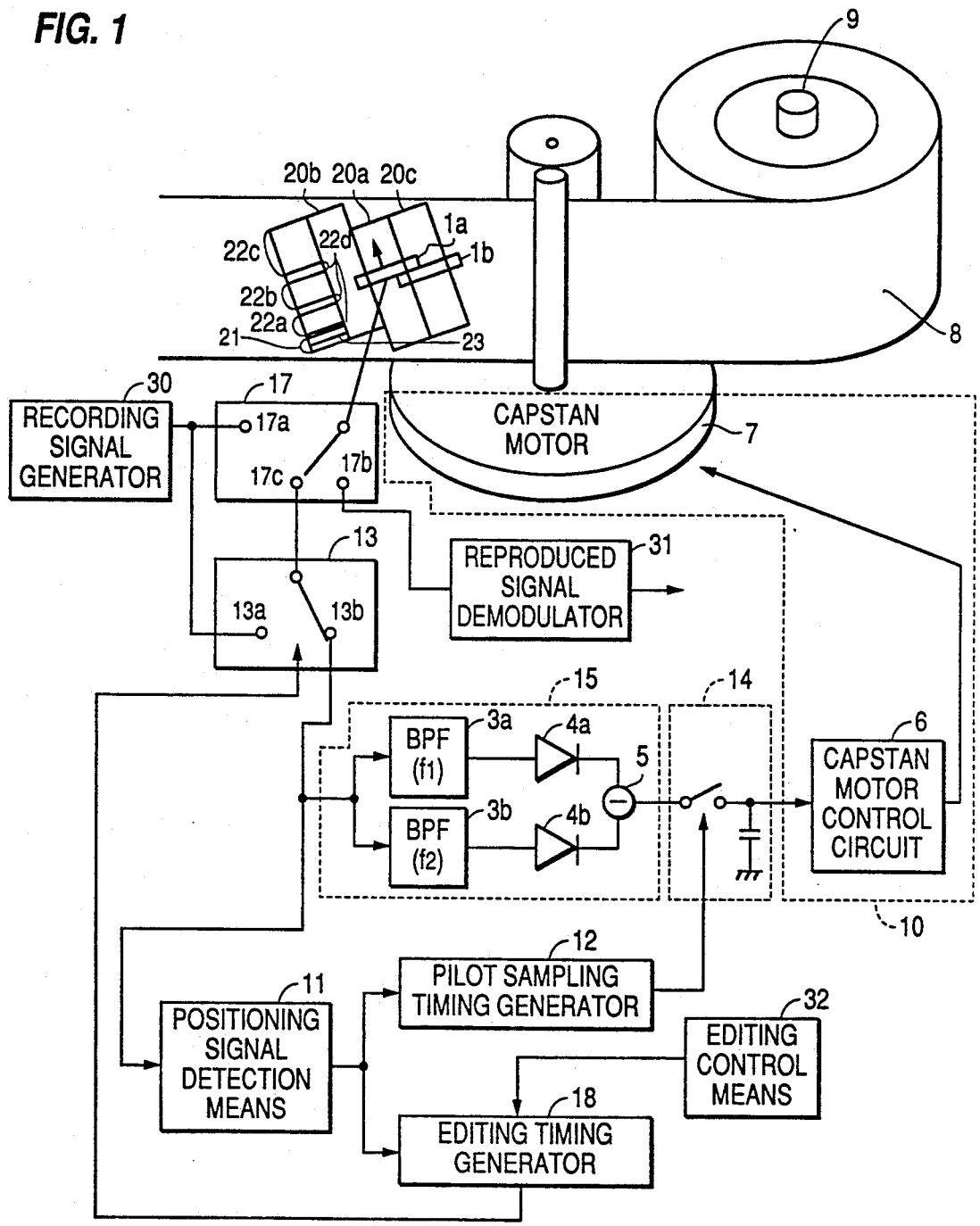
FIG. 1 is a schematic view of a magnetic recording/reproducing apparatus showing one embodiment of the present invention.
Figure 2:
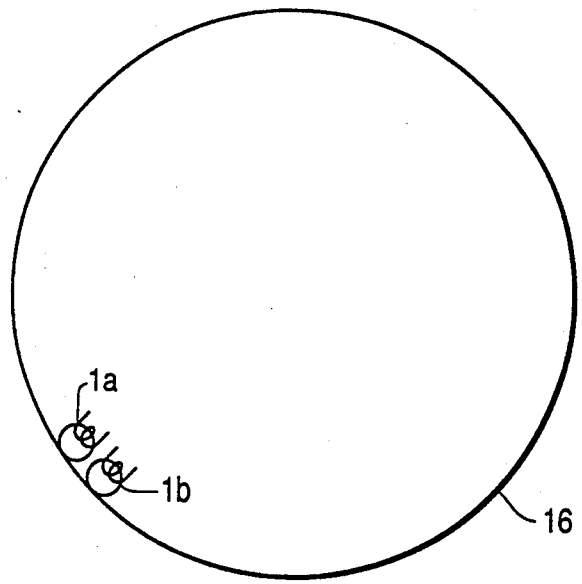
FIG.2 is a view of the assignment of magnetic heads on a rotary cylinder of the apparatus of the embodiment.

FIG.1 is a schematic view of the action of a magnetic recording/reproducing apparatus showing one preferred embodiment of the present invention. As shown, there are provided two magnetic heads $1a, 1b$ mounted to a rotary cylinder (not shown) and a row of recording tracks $20a$, $20b, 20c$ formed on a magnetic recording tape 8. A tracking error detection circuit 15 is composed mainly of two bandpass filters $3a$, $3b$, two AM detection circuits $4a$, $4b$, and a subtraction circuit 5. A capstan motor control circuit 6 is provided for control of the action of a capstan motor 7. The capstan motor control circuit 6 and the capstan motor 7 constitute in combination a tape running control means 10. A tape running means 9 is provided for rewinding a magnetic tape 8. Also, there are arranged an operation mode switch circuit 17, a positioning signal detection means 11, a pilot sampling timing generator circuit 12, an editing timing generator circuit 18, an editing control means 32, an editing switch 13, a sample and hold circuit 14, a recording signal generator 30, and a reproduced signal demodulator 31. This embodiment resides in recording and reproducing of data of two tracks at almost one time with the two channel magnetic heads $1a$, $1b$. FIG. 2 illustrates the assignment of the two magnetic heads $1a$, $1b$ on the rotary cylinder 16, according to the embodiment of the present invention.

Figure 3:
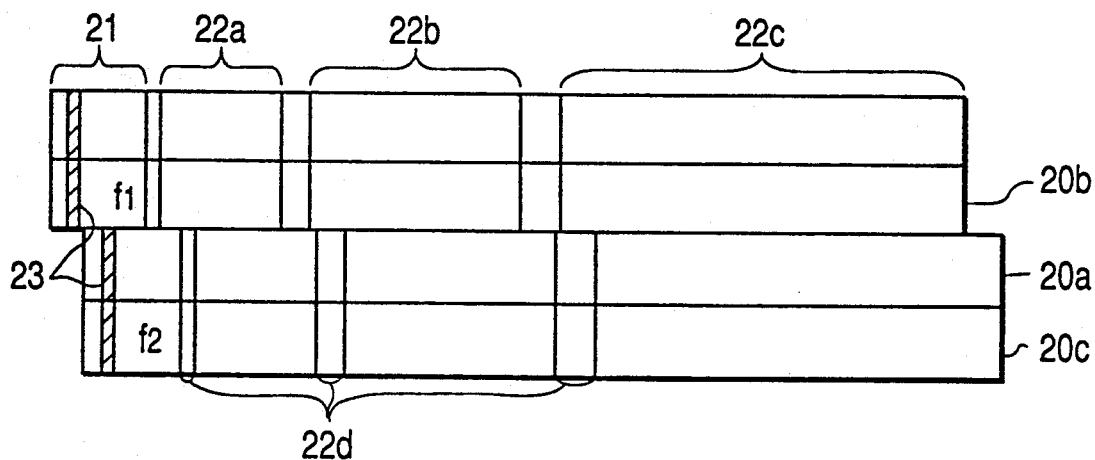
FIG.3 is a view of recording tracks according to the embodiment.

FIG. 3 illustrates the allocation of the recording areas in each recording track shown in FIG. 1, in which a positioning signal 23 is stored in a region ,of a first recording area 21 assigned at the beginning end of the track. The first recording area 21 also contains in a frequency multiplexing form a pilot signal for tracking control. In the embodiment, two different types of the pilot signals having frequencies f1 and f2 respectively are recorded alternately into the tracks by the same manner as of the prior art. Other information recording areas $22a$ to $22c$ of the track following the first recording area 21 contain various data signals. Any two adjacent recording areas in the track are separated from each other by a gap $22d$. The gap $22d$ is arranged to become greater in width towards the end of the track, as shown in FIG. 3. The information recording areas $22a$ to $22c$ are aligned in the track from the smallest at front end and to the largest at rear end. For example, in the case of a digital VTR, an index data signal which indicates a track position in the tape may be recorded into the recording area $22a$, a digital audio signal in the recording area $22b$, and a digital video signal in the recording area $22c$. As described, such a recording technique is well known in which various data signals are recorded into different recording areas of each track which are separated from one another by a plurality of gaps. Hence, an arrangement for implementation of the recording technique will not be described.

Figure 4:
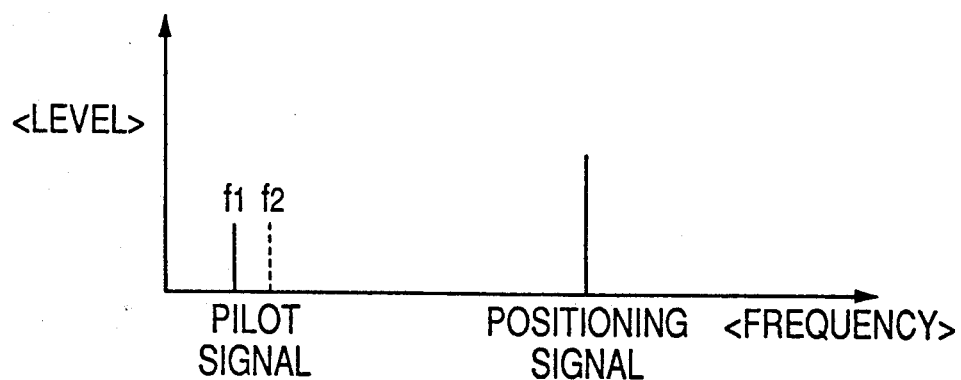
FIG.4 is a spectrum diagram showing a pilot signal and a positioning signal stored in a recording track.

FIG. 4 is a spectrum diagram showing the positioning signal 23 stored in the first recording area 21. As shown, the two frequencies f1,f2 of their respective pilot signals are so low as to be less affected by an azimuth loss of the magnetic head. The frequency of the positioning signal is high enough to avoid interference from the neighbor track.

The action of recording, reproducing, and editing modes will be explained.

At the recording mode, the magnetic head 1a is connected to a terminal 17a of the operation mode switch circuit 17 so that it receives a data signal from the recording signal generator circuit 30 and records it onto a given track of the recording tape as shown in FIG. 3. Simultaneously, the magnetic head 1b receives another data signal and records it onto a neighbor track next to the given track.

At the reproducing mode, the operation mode switch circuit 17 is shifted to a terminal 17b for transmission of a reproduced signal from the head 1a to the reproduced signal demodulator 31 where the reproduced signal is demodulated. Also, another reproduced signal from the head 1b is simultaneously transferred to a reproduced signal demodulator where it is demodulated (not shown).

Figure 5:
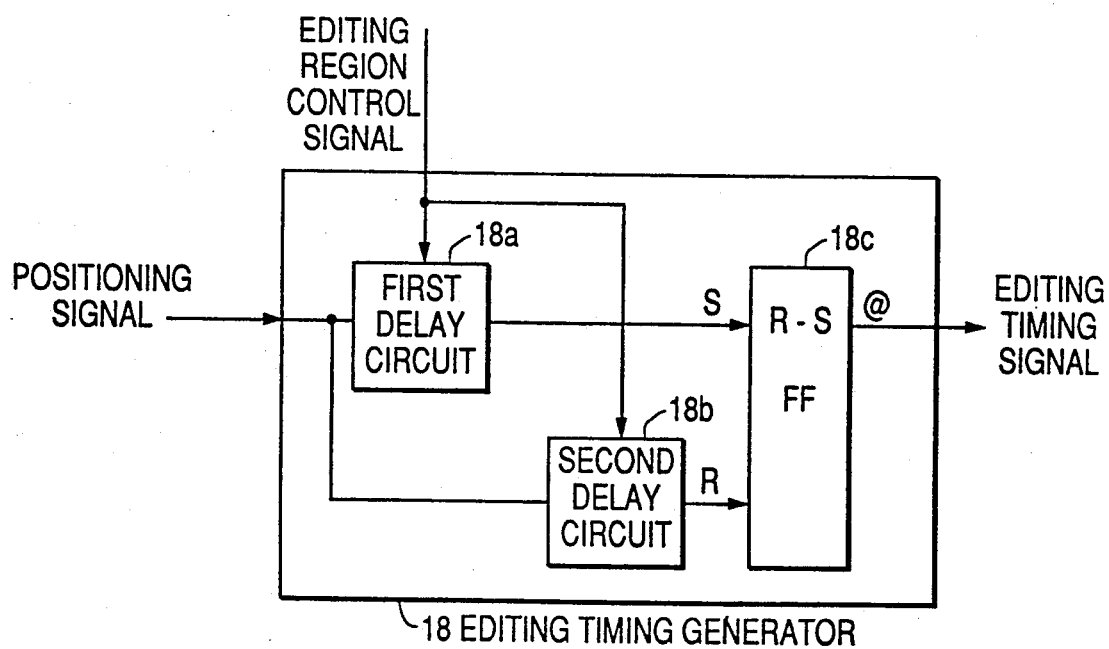
FIG.5 is a detailed diagram of an editing timing signal generator circuit of the apparatus of the embodiment.
Figure 6:
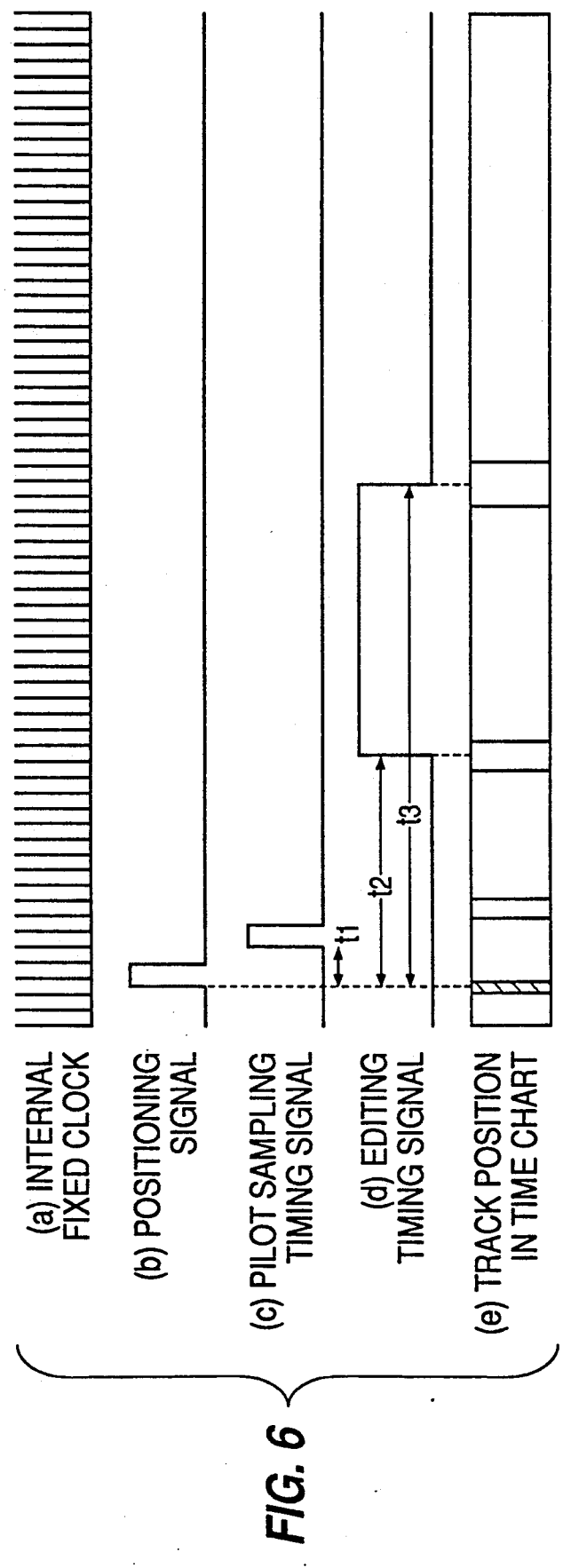
FIG.6 is a time chart of the signals during an insert editing action according to the embodiment.

The action of an editing mode will now be explained in which the data signal recorded on a track as shown in FIG. 3 is replaced with another data signal. The operation mode switch circuit 17 is shifted to a terminal 17c for communication with the magnetic head 1a, as shown in FIG. 1. Upon starting a scanning action of the head 1a along the track 20a, the editing switch 13 is turned to a terminal 13b for transmission of a reproduced signal from the head 1a. The reproduced signal supplied from the head 1a contains two pilot signal components f1,f2 of their respective adjacent tracks 20b, 20c on both sides of the track 20a. The two pilot components f1,f2 are extracted from the reproduced signal by their respective bandpass filters 3a, 3b and converted by the AM detection circuits 4a, 4b to two DC components respectively. The two DC components are then fed to the subtraction circuit 5 where they are compared with each other to produce a tracking error signal. The succeeding action will be explained also referring to FIGS. 5 and 6. The reproduced signal from the head 1a is also fed to the positioning signal detection means 11 where the positioning signal 23 of a given frequency stored in the first recording area 21 is extracted from the reproduced signal and delivered as a pulse signal shown in FIG. 6-b. The pulse signal of the positioning signal detection means 11 is fed to the pilot sampling timing generator circuit 12 which in turn counts clock pulses of an internal clock installed in the tape recording medium editing apparatus of the present invention, as shown in FIG. 6-a. After a given number of clock pulses are counted which corresponds to the duration of a delay time t1, a pilot sampling timing signal shown in FIG. 6-c is generated. In response to the pilot sampling timing signal, the sample and hold circuit 14 starts sampling the tracking error signal supplied from the tracking error detection circuit 15. A sampled tracking error data of the sample and hold circuit 14 is then transferred to the capstan motor control circuit 6 for controlling the tracing of the magnetic head 1a along a target track 20a to be scanned. The pulse signal of the positioning signal detection circuit 11 is also fed to the editing timing generator 18. For rewriting data in a particular recording area, its start and end locations of the area have to be determined. As illustrated in FIG. 5, the editing timing generator 18 receives an editing area indicating signal from the editing control means 32 and according to the signal, determines a delay time t2 of its first delay circuit 18a and a delay time t3 of its second delay circuit 18b. Hence, the two delay circuits 18a, 18b produce their respective delay pulse signals through counting pulses of their internal clocks, similar to the pilot sampling timing generator circuit 12 and send them to an R-S FF circuit 18c shown in FIG. 5 which in turn produces an editing timing signal shown in FIG. 6-d. It is now assumed that the editing timing signal is for rewriting of data in the third recording area 22b of the track. The editing timing signal is fed to the editing switch 13 for switching control. When the editing timing signal is at an "H" level, the editing switch 13 is turned from the terminal 13b to the terminal 13a for transmitting a rewriting data signal to the magnetic head 1a. As a result, the existing data signal in the third recording area 22b is replaced with the rewriting data signal. While the rewriting data signal is fed to the magnetic head 1a through the editing switch 13 turned from the terminal 13b to the terminal 13a by the editing timing signal of the editing timing generator 18, another rewriting data signal is concurrently supplied to the magnetic head 1b through an editing switch (not shown). Accordingly, the two existing data signals stored in their respective third recording areas 22b of the two adjacent tracks can be replaced with new data signals at approximately the same time. The magnetic head 1b is arranged adjacent to the magnetic head 1a so that its relative position to the head 1a remains unchanged. This allows the head 1b to trace the track 20b with equal accuracy while the head 1a is being scanned along the track 20a. It is hence unnecessary to provide a positioning signal to a second track which is scanned by the magnetic head 1b. Although FIG. 6 explains the rewriting of data in the third recording area, the other recording areas of the track will be rewritten with equal success.

The same rewriting action will be used for recording a new data into the recording areas 22a to 22c while only the first recording area 21 is being loaded with the existing data signal.

It is advisable that the positioning signal be formed of a combination of a sync signal and its identifying data which are repeatedly digitally recorded for detection of a recording location at higher accuracy.

Although the embodiment of the present invention resides in two-channel simultaneous recording actions with the use of two magnetic heads, it is not limitative and other recording techniques will be employed with equal success.

Although the tracking pilot signals of the embodiment are used of two different frequency types, they may be four different frequency type signals which are commonly used in 8-mm video systems or a series of one single type which are allocated to different recording locations by a like manner as of a digital audio tape recorder (DAT). The assignment of the tracking pilot signals to recording areas will not be limited.

In the embodiment, the tracking control is carried out using pilot signals multiplex recorded into the first recording area of each track. Also, the tracking control may be executed by a known manner, as used in the VHS video recording system, in which tracking control signals are recorded into linear tracks arranged at the edges of a recording tape while the first recording areas of their respective tracks are loaded with positioning signals used for editing.

The present invention is not limited to a magnetic recording system but also applicable to other recording systems including optical recording.

What is claimed is:

1. An editing device for editing a tape recording medium which has formed thereon a plurality or recording tracks, each recording track being divided into a plurality of recording areas which are separated from one another by a plurality of gaps, the first one of the recording areas of each recording track carrying a positioning signal for identifying the position of a recorded data and a pilot signal for tracking control which both are multiplexed, said device comprising:

recording information signal generating means for generating a recording information signal for editing;

recording and reproducing head for recording and reproducing said recording information signal on the tape recording medium;

selecting means for selecting between a first mode in which said recording information signal is fed to said recording and reproducing head for recording onto the tape recording medium and a second mode in which said recording information signal is retrieved by said recording and reproducing head from the tape recording medium;

editing control means for informing said selecting means of a location to be edited;

positioning signal detecting means for picking up said positioning signal from said recording information signal retrieved with said selecting means held in the second mode;

tracking error detecting means for producing a tracking error signal by examining said pilot signals of two adjacent recording tracks extracted from said recording information signal retrieved with said selecting means in the second mode;

timing signal generating means for producing a sampling signal from said positioning signal given by said positioning signal detecting means;

sampling means for sampling said tracking error signal with said sampling signal to produce a sampled tracking error signal; and tracking control means for eliminating tracking errors created during scanning of said recording and reproducing head over the recording tracks of the recording medium using said sampled tracking error signal of said sampling means;

said selecting means arranged to select the second mode during scanning of said recording and reproducing head across said first recording area of the target recording track so that the tracking control with said tracking error signal of said tracking control means is carried out and to select the first mode for recording said recording information signal of said recording information signal generating means onto a predetermined edit location of the recording medium instructed by said editing control means according to said positioning signal of said positioning signal detecting means.

2. An editing device according to claim 1, wherein said editing control means is arranged to produce an edit positioning signal, said timing signal generating means is arranged responsive to both the positioning signal and the edit positioning signal for producing an edit timing signal which signal which indicates an edit area on the target recording track where said recording information signal is to be recorded, and said selecting means is arranged responsive to the edit timing signal for selecting the first mode.

3. An editing device according to claim 2, wherein said edit timing signal consists of a first delay signal retarded by a first delay period from said positioning signal and a second delay signal retarded by a second delay period from the same so that said edit area of the recording track is defined between the first and second delay signals.

4. An editing device according to claim 1, wherein frequency components of said positioning signal are of a higher frequency than those of said pilot signal.

5. An editing device according to claim 1, wherein a plurality of said recording and reproducing heads are provided and at least two of them are operable simultaneously for recording or reproducing.

6. An editing device according to claim 1, wherein said gaps alternated with said recording areas of each recording track are arranged so that their width becomes greater as they are located farther from the front end of the recording track.

7. An editing device according to claim 6, wherein said recording areas of each recording track separated from one another by said gaps are arranged so that their width becomes greater as they are located farther from the front end of the recording track.

8. An editing device for editing a tape recording medium which has formed thereon a plurality of recording tracks, each recording track being divided into a plurality of recording areas which are separated from one another by a plurality of gasp, the first one of the recording areas of each recording track carrying a positioning signal for identifying the position of a recorded data and a pilot signal for tracking control which both are multiplexed, said device comprising:

recording information signal generating means for generating a recording information signal for editing;

recording and reproducing head for recording and reproducing said recording information signal on the tape recording medium;

selecting means for selecting between a first mode in which said recording information signal is fed to said recording and reproducing head for recording onto the tape recording medium and a second mode in which said recording information signal is retrieved by said recording and reproducing head from the tape recording medium;

editing control means for informing said selecting means of a location to be edited;

positioning signal detecting means for picking up said positioning signal from said recording information signal retrieved with said selecting means in the second mode;

tracking error detecting means for producing a tracking error signal by examining said pilot signals of two adjacent recording tracks extracted from said recording information signal retrieved with said selecting means in the second mode, according to the timing of said positioning signal of said positioning signal detecting means; and tracking control means for eliminating tracking errors created during scanning of said recording and reproducing head over the recording tracks of the recording medium using said tracking error signal of said tracking error detecting means;

said selecting means arranged to select the second mode during scanning of said recording and reproducing head across said first recording area of the target recording track so that the tracking control with said tracking error signal of said tracking control means is carried out and to select the first mode for recording said recording information signal of said recording information signal generating means onto a predetermined edit location of the recording medium instructed by said editing control means according to said positioning signal of said positioning signal detecting means.

* * * * *